(12) United States Patent
Liu

(10) Patent No.: US 10,271,201 B2
(45) Date of Patent: Apr. 23, 2019

(54) NETWORK REGISTRATION METHOD AND REGISTRATION DEVICE

(71) Applicant: Yulong Computer Telecommunication Scientific (Shenzhen) Co., Ltd., Shenzhen, Guangdong (CN)

(72) Inventor: Yong Liu, Guangdong (CN)

(73) Assignee: Yulong Computer Telecommunication Scientific (Shenzhen) Co., Ltd., Shenzhen, Guangdong (CN)

( * ) Notice: Subject to any disclaimer, the term of this patent is extended or adjusted under 35 U.S.C. 154(b) by 92 days.

(21) Appl. No.: 15/613,669

(22) Filed: Jun. 5, 2017

(65) Prior Publication Data
US 2017/0272936 A1 Sep. 21, 2017

Related U.S. Application Data

(63) Continuation-in-part of application No. PCT/CN2014/093371, filed on Dec. 9, 2014.

(51) Int. Cl.
*H04W 8/00* (2009.01)
*H04W 8/20* (2009.01)
*H04W 4/50* (2018.01)
*H04W 60/00* (2009.01)
*H04W 8/18* (2009.01)

(52) U.S. Cl.
CPC ............. *H04W 8/205* (2013.01); *H04W 4/50* (2018.02); *H04W 8/183* (2013.01); *H04W 60/00* (2013.01)

(58) Field of Classification Search
CPC ....... H04W 8/205; H04W 8/183; H04W 4/50; H04W 60/00
See application file for complete search history.

(56) References Cited

U.S. PATENT DOCUMENTS

| | | | | |
|---|---|---|---|---|
| 2013/0273972 | A1* | 10/2013 | Korkiakoski | H04L 67/306 455/558 |
| 2015/0072650 | A1* | 3/2015 | Xia | H04W 12/06 455/411 |
| 2015/0237497 | A1* | 8/2015 | Chen | H04W 8/183 455/558 |

FOREIGN PATENT DOCUMENTS

| | | |
|---|---|---|
| CN | 101252773 A | 8/2008 |
| CN | 101754324 A | 6/2010 |
| CN | 103731813 A | 4/2014 |

\* cited by examiner

*Primary Examiner* — Khai M Nguyen
(74) *Attorney, Agent, or Firm* — Young Basile Hanlon & MacFarlane, P.C.

(57) ABSTRACT

Provided is a network registration method and registration device for a terminal, and the terminal supports network standards of multiple operators. The network registration method includes: the identification code of a subscriber identity module is obtained after the subscriber identity module is installed on the terminal; the operator that the subscriber identity module belongs to is determined according to the identification code of the subscriber identity module; the subscriber identity module is led to register in the network of the operator that the subscriber identity module belongs to according to the operator that the subscriber identity module belongs to.

17 Claims, 9 Drawing Sheets

NETWORK REGISTRATION METHOD AND REGISTRATION DEVICE

CROSS-REFERENCE TO RELATED APPLICATION(S)

This application is a continuation-in-part of International Application No. PCT/CN2014/093371, filed on Dec. 9, 2014, the content of which is incorporated by reference herein in its entirety.

TECHNICAL FIELD

The present disclosure relates to the field of terminal technology, and particularly to a network registration method for a terminal and a registration device for a terminal.

BACKGROUND

At present, a terminal can fall into one of two categories: customized terminals of operators, and non-customized terminals.

A customized terminal of an operator is often required to meet specifications and business requirements of the operator. The boot interface and UI icon design of the terminal can be unique to the operator. There is also a limit on what type of Subscriber Identity Module (SIM) card the user uses. The non-customized terminal is relatively free, and SIM card of multiple operators can be used. However, the terminal is usually dominated by a certain operator, and it can be difficult to satisfy the requirements of all operators.

In addition, the software design of the terminal is typically solidified after product definition, which can make automatic adjustment in response to changes in the market demand more difficult later. If terminals with the same chip are required to satisfy the requirements of multiple operators, a variety of projects can be developed simultaneously, but the development cost can be high and the development cycle can be long.

SUMMARY

Based on at least one of the above technical problems, in the present disclosure, a new network registration scheme for a terminal is proposed, through which the terminal can automatically select a network of an operator to be registered according to the SIM card type, whereby different demands of users can be satisfied and user experience can be improved; on the other hand, for terminal developers, there is no need to develop a variety of projects to satisfy the requirements of different operators, which can shorten the product development cycle and reduce product development costs.

In view of this, a network registration method for a terminal is proposed, among which the terminal supports network standards of multiple operators. The network registration method includes: the identification code of a subscriber identity module is obtained after the subscriber identity module is installed on the terminal; the operator that the subscriber identity module belongs to is determined according to the identification code of the subscriber identity module; the subscriber identity module is led to register in the network of the operator that the subscriber identity module belongs to according to the operator that the subscriber identity module belongs to.

According to a second aspect of the present disclosure, it is provided a network registration device of a terminal, among which the terminal can support network standards of multiple operators. The network registration device includes: an obtaining unit, configured to obtain the identification code of a subscriber identity module after the subscriber identity module is installed on the terminal; a determining unit, configured to determine the operator that the subscriber identity module belongs to according to the identification code of the subscriber identity module; a registering unit, configured to lead the subscriber identity module to register in the network of the operator that the subscriber identity module belongs to according to the operator that the subscriber identity module belongs to.

According to a third aspect of the present disclosure, there is provided a computer readable storage medium. The computer readable storage medium includes program code, when executed on data-processing apparatus, the program code is adapted to cause the data-processing apparatus to perform the operations of: obtaining the identification code of a subscriber identity module after the subscriber identity module is installed on the terminal; determining the operator that the subscriber identity module belongs to according to the identification code of the subscriber identity module; leading the subscriber identity module to register in the network of the operator that the subscriber identity module belongs to according to the operator that the subscriber identity module belongs to.

As one implementation, before obtaining the identification code of the subscriber identity module, when executed on data-processing apparatus, the program code is adapted to cause the data-processing apparatus to perform the operations of: judging whether an associated operator of the terminal has been set by user; if it is judged that a designated operator has been set as the associated operator of the terminal by user, leading the subscriber identity module to register in the network of the designated operator; if it is judged that the associated operator of the terminal has not been set by user, proceed to the process of obtaining the identification code of the subscriber identity module.

As one implementation, after it is judged that the associated operator of the terminal has not been set by user and before obtaining the identification code of the subscriber identity module, when executed on data-processing apparatus, the program code is adapted to cause the data-processing apparatus to perform the operations of: judging whether automatic detection of the operator that the subscriber identity module belongs to is required; if it is judged that the automatic detection of the operator that the subscriber identity module belongs to is required, proceed to the process of obtaining the identification code of the subscriber identity module; if it is judged that the automatic detection of the operator that the subscriber identity module belongs to is not required, loading default configuration information and loading the system of the terminal according to the default configuration information.

As one implementation, when executed on data-processing apparatus, the program code is further adapted to cause the data-processing apparatus to perform the operations of: when failed to determine the operator that the subscriber identity module belongs to according to the identification code of the subscriber identity module, loading default configuration information and loading the system of the terminal according to the default configuration information.

With aid of the above-mentioned technical schemes, the terminal can automatically select a network of an operator to be registered according to the type of a SIM card, whereby different demands of users can be satisfied and user experience can be improved; on the other hand, for terminal developers, there is no need to develop a variety of projects to satisfy the requirements of different operators, which can shorten the product development cycle and reduce product development costs.

DETAILED DESCRIPTION

Figure 1:
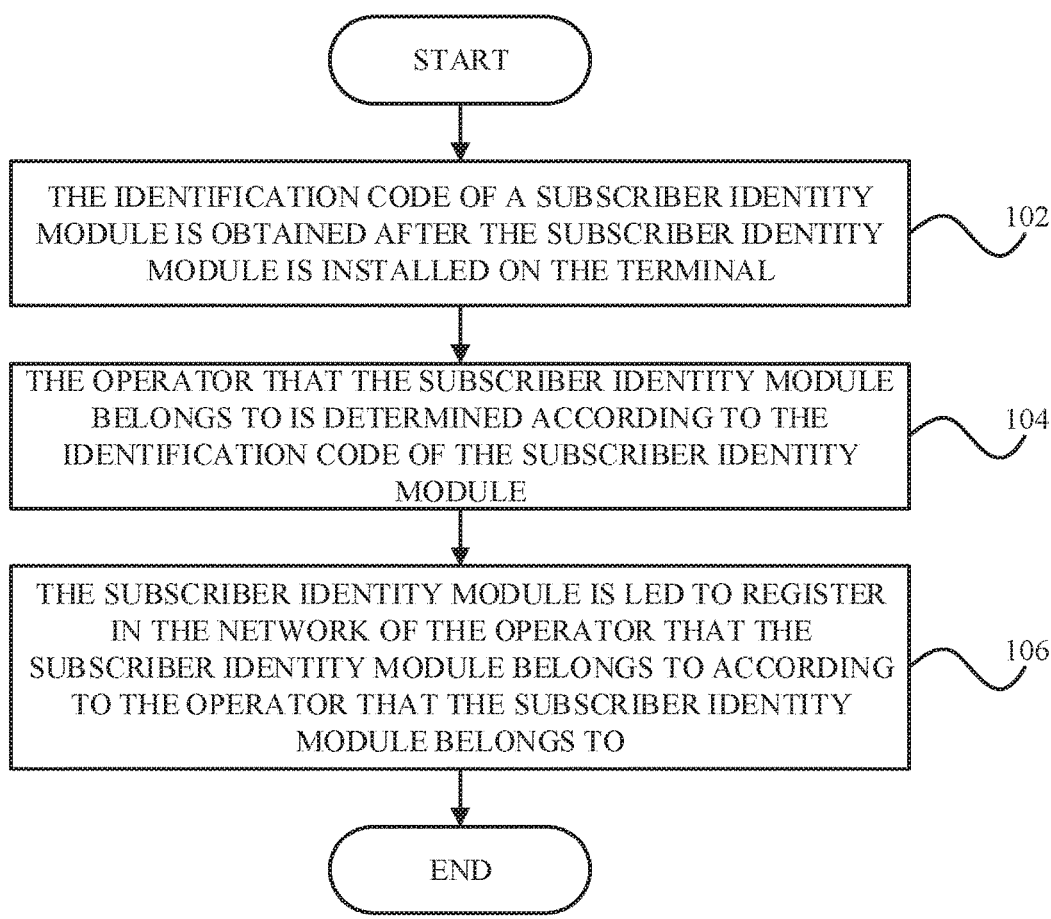
FIG. 1 is a schematic flow chart illustrating a network registration method of a terminal according to an implementation of the present disclosure.

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

In the following description, numerous specific details are set forth in order to facilitate a thorough understanding of the present disclosure, however, the present disclosure can be practiced otherwise than as specifically described herein, and therefore, the scope of the present disclosure is not to be limited by the specific implementations disclosed below.

Non-customized terminals are usually dominated by a certain operator with specifications and business requirements. The operators can include, for example, service providers of wireless communication, such as cellular and/or data communication services. For example, an operator can be a cellular company, a wireless carrier, or a mobile network operator. For example, a 4G terminal of a first operator can support TDD-LTE/TD-SCDMA/GSM network of the first operator, as well as WCDMA network when the terminal is roaming outside of the first operator. In another example, a 4G terminal of a second operator can support FDD-LTE/EVDO/1x network and GSM network of the first operator and a third operator, as well as WCDMA network when the terminal is roaming outside of the second operator.

In yet another example, a 4G terminal of the third operator can support FDD-LTE/WCDMA/GSM network and GSM network of the first operator.

If the terminal is dominated by a certain operator, it is difficult to satisfy the requirements of all operators (e.g., the first, the second, and the third operators). The difficulties can include the following examples.

First, due to radio frequency calibration and other issues, the terminal can only support a small number of network standards and is unable to support all network standards. For example, currently, when a SIM card of the second operator is inserted, the customized terminal of the first operator cannot register in 1x/EVDO network. Similarly, the customized terminal of the second operator cannot register in TDSCDMA/TDD-LTE network.

Second, the terminal is closely related to the operator and is limited by the operator, and it is difficult to register in a highest-priority network supported by the inserted SIM card according to the type of the inserted SIM card. For example, for some terminals, it is possible to register in a corresponding network when SIM card of the first operator or the third operator is inserted; however, for the customized terminal of the first operator, it is difficult to register automatically in WCDMA/FDD-LTE network when SIM card of the third operator is inserted.

Third, free switch between different customized operators cannot be realized. For example, it is difficult to change a terminal into a customized terminal of the first operator, the third operator, or the second operator via settings so as to meet different demands of users.

FIG. 1 is a schematic flow chart illustrating a network registration method of a terminal according to an implementation of the present disclosure.

As illustrated in FIG. 1, the network registration method according to the implementation of the present disclosure includes: S102, the identification code of a subscriber identity module is obtained after the subscriber identity module is installed on the terminal; S104, the operator that the subscriber identity module belongs to is determined according to the identification code of the subscriber identity module; S106, the subscriber identity module is led to register in the network of the operator that the subscriber identity module belongs to according to the operator that the subscriber identity module belongs to.

In this technical scheme, the terminal is a terminal that supports network standards of multiple operators, that is, the terminal can support the networks of multiple operators (such as two or all of the first operator, the second operator, or the third operator). By obtaining the identification code (that is, Integrate Circuit Card Identity, ICCID) of the subscriber identity module (that is, the SIM card), it is possible to determine the operator that the subscriber identity module belongs to accurately, that is, it is possible to determine the operator that the SIM card inserted by the user belongs to, and further lead the SIM card to register in the network of a corresponding operator. In this way, the terminal can select the network of the operator to be registered according to the SIM card type, and different demands of users can be satisfied.

Specifically, when the terminal according to the present disclosure is used, the terminal can automatically select and register in the corresponding network, and the user does not need to pay attention to which operator the SIM card belongs to, this will help improve the user experience. For terminal developers, there is no need to develop a variety of projects to satisfy the requirements of different operators, therefore, the product development cycle can be shorten, and the cost of product development can be reduced.

In the above-mentioned technical scheme, as an implementation, before the identification code of the subscriber identity module is obtained, the method can further includes: it is judged whether the user has set an associated operator of the terminal; and if it is judged that the user has set a designated operator as the associated operator of the terminal, the subscriber identity module is led to register in the network of the designated operator; and if it is judged that the user has not set the associated operator of the terminal, proceed to the operation of obtaining the identification code of the subscriber identity module.

In this technical scheme, before obtaining the identification code of the subscriber identity module so as to automatically select the operator for network registration, it can also be judged that whether the user has set the associated operator, and if yes, the SIM card can be led directly to register in the network of the associated operator. This scheme can have a variety of application scenarios, for example, the user can autonomously set the terminal to be a customized terminal for an operator according to the SIM card type; or, an operator can set a terminal to be a customized terminal of its own. For terminal developers, the same terminal product can be developed for all operators, and corresponding associated operators can be set for different terminals respectively, this can avoid increasing the cost of product development caused by developing a variety of projects to satisfy the requirements of different developers.

In the above-mentioned technical scheme, as an implementation, after judging that the user has not set the associated operator of the terminal and before obtaining the identification code of the subscriber identity module, the method further includes: it is judged whether automatic detection of the operator that the subscriber identity module belongs to is required; if it is judged that the automatic detection of the operator that the subscriber identity module belongs to is required, the identification code of the subscriber identity module is obtained; and if it is judged that the automatic detection of the operator that the subscriber identity module belongs to is not required, default configuration information is loaded and the system of the terminal will be loaded according to the default configuration information.

In this technical scheme, if the user has not set the associated operator of the terminal and it is not required to obtain the identification code of the subscriber identity module so as to automatically select the operator for network registration, the default configuration information of the terminal can be loaded so as to load the system of the terminal, and after the system of the terminal is loaded, the subscriber identity module can be led to register in the network according to default configuration.

In the above-mentioned technical scheme, as an implementation, the method further includes: when failed to determine the operator that the subscriber identity module belongs to according to the identification code of the subscriber identity module, the default configuration information is loaded, and the system of the terminal is loaded according to the default configuration information.

In this technical scheme, if it is required to obtain the identification code of the subscriber identity module so as to automatically select the operator for network registration, and failed to determine the operator that the subscriber identity module belongs to according to the identification code of the subscriber identity module, the system of the terminal can be loaded according to the default configuration information, and after the system of the terminal is loaded, the terminal can be led to register in the network according to default configuration.

In the above-mentioned technical scheme, as an implementation, before the subscriber identity module is led to register in the network of the operator that the subscriber identity module belongs to, the method further includes: according to the information of the operator that the subscriber identity module belongs to, configuration information corresponding to the operator that the subscriber identity module belongs to is loaded, and the system of the terminal is loaded according to the configuration information.

In this technical scheme, the configuration information corresponding to the operator that the subscriber identity module belongs to is loaded according to the information of the operator that the subscriber identity module belongs to, and the system of the terminal is loaded according to the configuration information, in this way, the terminal can adjust the configuration of the system of its own with regard to the operator that the subscriber identity module belongs to, and therefore, it is possible to ensure the adaptation to the needs of the operator.

In the above-mentioned technical scheme, as an implementation, the configuration information includes at least one of the following or a combination thereof: personalized resources set for the operator that the subscriber identity module belongs to, the functional framework of the terminal, and hardware configuration parameters of the terminal.

Among which the personalized resources set for the operator that the subscriber identity module belongs to can be boot screen/shutdown screen of the terminal, UI icons and the like; the functional framework of the terminal includes at least one of the following or a combination thereof: Phone type, whether data service serialization is supported, dual-standby single-pass solution or dual-standby dual-pass solution, LTE voice solutions such as SVLTE, SGLTE, SRLETE, VOLTE, CSFB, and the like; the hardware configuration parameters of the terminal include the configuration scheme of a communication module.

In the above mentioned technical scheme, as an implementation, the operation that the subscriber identity module is led to register in the network of the operator that the subscriber identity module belongs to can be implemented as follows: according to the priority of a plurality of communication networks of the operator that the subscriber identity module belongs to as well as network standards supported by the subscriber identity module, the subscriber identity module is led to register in a communication network supported by the terminal and having the highest priority among the plurality of communication networks.

In this technical scheme, the subscriber identity module is led to register in the communication network supported by the terminal and having the highest priority among the plurality of communication networks, in this way, after the SIM card is inserted into the terminal, the user does not need to pay attention to which operator the SIM card belongs to or concern the SIM card type; the terminal can automatically select the operator and the network, this greatly facilitates the operation of the user and is conducive to enhance the user experience.

Figure 2:
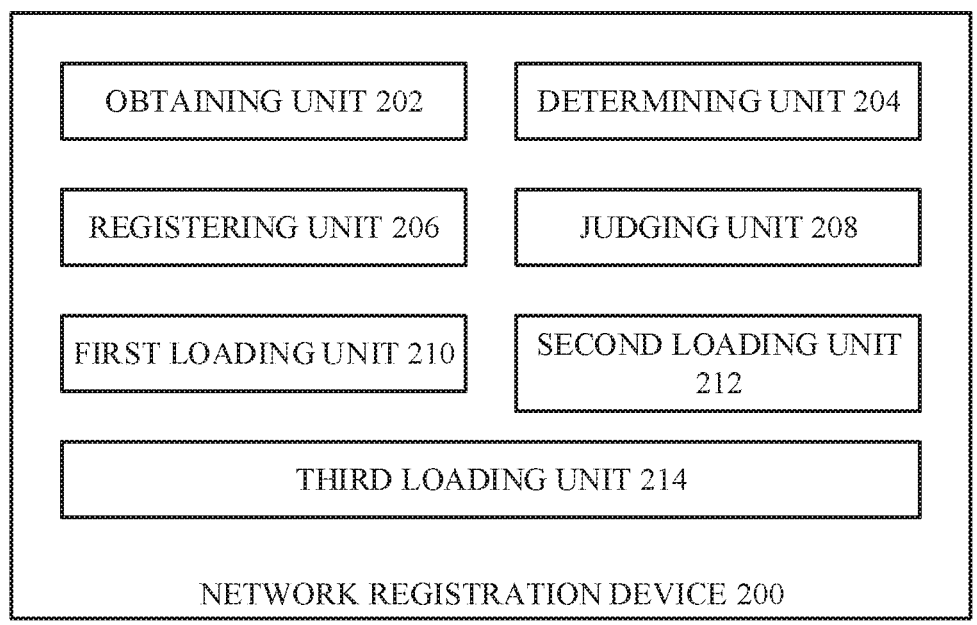
FIG. 2 is a schematic block diagram illustrating a network registration device of a terminal according to an implementation of the present disclosure.

FIG. 2 is a schematic block diagram illustrating a network registration device of a terminal according to an implementation of the present disclosure.

As illustrated in FIG. 2, the network registration device 200 of a terminal according to the implementation of the present disclosure includes: an obtaining unit 202, configured to obtain the identification code of a subscriber identity module after the subscriber identity module is installed on the terminal; a determining unit 204, configured to determine the operator that the subscriber identity module belongs to according to the identification code of the subscriber identity module; a registering unit 206, configured to lead the subscriber identity module to register in the network of the operator that the subscriber identity module belongs to according to the operator that the subscriber identity module belongs to.

In this technical scheme, the terminal is a terminal that supports network standards of multiple operators, that is, the terminal can support the networks of multiple operators (such as two or all of the first operator, the second operator, or the third operator). By obtaining the identification code (that is, Integrate Circuit Card Identity, ICCID) of the subscriber identity module (that is, the SIM card), it is possible to determine the operator that the subscriber identity module belongs to accurately, that is, it is possible to determine the operator that the SIM card inserted by the user belongs to, and further lead the SIM card to register in the network of a corresponding operator. In this way, the terminal can select the network of the operator to be registered according to the SIM card type, and different demands of users can be satisfied.

Specifically, when the terminal according to the present disclosure is used, the terminal can automatically select and register in the corresponding network, and the user does not need to pay attention to which operator the SIM card belongs to, this will help improve the user experience. For terminal developers, there is no need to develop a variety of projects to satisfy the requirements of different operators, therefore, the product development cycle can be shorten, and the cost of product development can be reduced.

In the above-mentioned technical scheme, as an implementation, the device 200 further includes: a judging unit 208, configured to judge whether the user has set an associated operator of the terminal, before the identification code of the subscriber identity module is obtained by the obtaining unit 202; the registering unit 206 is configured to lead the subscriber identity module to register in the network of a designated operator if the judging unit 208 judges that the user has set the designated operator as the associated operator of the terminal; and the obtaining unit 202 is configured to obtain the identification code of the subscriber identity module if the judging unit 208 judges that the user has not set the associated operator of the terminal.

In this technical scheme, before obtaining the identification code of the subscriber identity module so as to automatically select the operator for network registration, it can also be judged that whether the user has set the associated operator, and if yes, the SIM card can be led directly to register in the network of the associated operator. This scheme can have a variety of application scenarios, for example, the user can autonomously set the terminal to be a customized terminal for an operator according to the SIM card type; or, an operator can set a terminal to be a customized terminal of its own. For terminal developers, the same terminal product can be developed for all operators, and corresponding associated operators can be set for different terminals respectively, this can avoid increasing the cost of product development caused by developing a variety of projects to satisfy the requirements of different developers.

In the above-mentioned technical scheme, as an implementation, the judging unit 208 is further configured to: after the judging unit judges that the user has not set the associated operator of the terminal and before the identification code of the subscriber identity module is obtained by the obtaining unit 202, judge whether automatic detection of the operator that the subscriber identity module belongs to is required. The obtaining unit 202 is configured to obtain the identification code of the subscriber identity module when the judging unit 208 judges that the automatic detection of the operator that the subscriber identity module belongs to is required; and the network registration device 200 for a terminal can further includes: a first loading unit 210, configured to load default configuration information and load the system of the terminal according to the default configuration information when the judging unit 208 judges that the automatic detection of the operator that the subscriber identity module belongs to is not required.

In this technical scheme, if the user has not set the associated operator of the terminal and it is not required to obtain the identification code of the subscriber identity module so as to automatically select the operator for network registration, the default configuration information of the terminal can be loaded so as to load the system of the terminal, and after the system of the terminal is loaded, the subscriber identity module can be led to register in the network according to default configuration.

In the above-mentioned technical scheme, as an implementation, the device 200 further includes: a second loading unit 212, configured to load the default configuration information and load the system of the terminal according to the default configuration information when the determining unit 204 fails to determine the operator that the subscriber identity module belongs to according to the identification code of the subscriber identity module.

In this technical scheme, if it is required to obtain the identification code of the subscriber identity module so as to automatically select the operator for network registration, and failed to determine the operator that the subscriber identity module belongs to according to the identification code of the subscriber identity module, the system of the terminal can be loaded according to the default configuration information, and after the system of the terminal is loaded, the terminal can be led to register in the network according to default configuration.

In the above-mentioned technical scheme, as an implementation, the device 200 further includes: a third loading unit 214, configured to load configuration information corresponding to the operator that the subscriber identity module belongs to according to the information of the operator that the subscriber identity module belongs to and load the system of the terminal according to the configuration information, before the subscriber identity module is led to register in the network of the operator that the subscriber identity module belongs to by the registering unit 206.

In this technical scheme, the configuration information corresponding to the operator that the subscriber identity module belongs to is loaded according to the information of the operator that the subscriber identity module belongs to, and the system of the terminal is loaded according to the configuration information, in this way, the terminal can adjust the configuration of the system of its own with regard to the operator that the subscriber identity module belongs to, and therefore, it is possible to ensure the adaptation to the needs of the operator.

In the above-mentioned technical scheme, as an implementation, the configuration information includes at least one of the following or a combination thereof: personalized resources set for the operator that the subscriber identity module belongs to, the functional framework of the terminal, and hardware configuration parameters of the terminal.

Among which the personalized resources set for the operator that the subscriber identity module belongs to can be boot screen/shutdown screen of the terminal, UI icons and the like; the functional framework of the terminal includes at least one of the following or a combination thereof: Phone type, whether data service serialization is supported, dual-standby single-pass solution or dual-standby dual-pass solution, LTE voice solutions such as SVLTE, SGLTE, SRLETE, VOLTE, CSFB, and the like; the hardware configuration parameters of the terminal include the configuration scheme of a communication module.

In the above-mentioned technical scheme, as an implementation, when it is needed to lead the subscriber identity module to register in the network of the operator that the subscriber identity module belongs to, the registering unit 206 is configured to: according to the priority of a plurality of communication networks of the operator that the subscriber identity module belongs to as well as network standards supported by the subscriber identity module, lead the subscriber identity module to register in a communication network supported by the terminal and having the highest priority among the plurality of communication networks.

In this technical scheme, the subscriber identity module is led to register in the communication network supported by the terminal and having the highest priority among the plurality of communication networks, in this way, after the SIM card is inserted into the terminal, the user does not need to pay attention to which operator the SIM card belongs to or concern the SIM card type; the terminal can automatically select the operator and the network, this greatly facilitates the operation of the user and is conducive to enhance the user experience.

Figure 3:
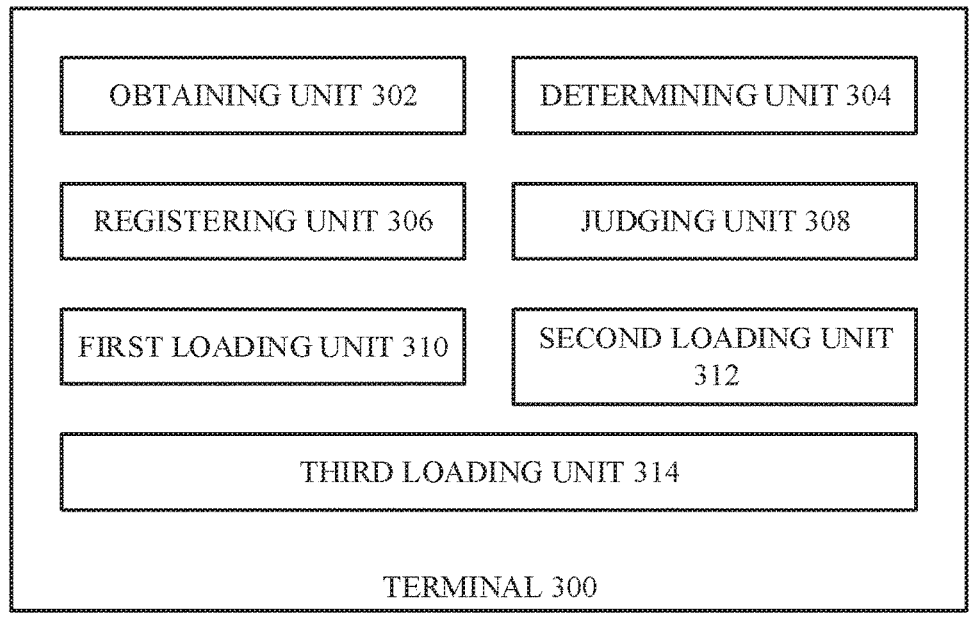
FIG. 3 is a schematic block diagram illustrating a terminal according to an implementation of the present disclosure.

FIG. 3 is a schematic block diagram illustrating a terminal according to an implementation of the present disclosure.

As illustrated in FIG. 3, a terminal 300 according to an implementation of the present disclosure includes: an obtaining unit 302, configured to obtain the identification code of a subscriber identity module after the subscriber identity module is installed on the terminal; a determining unit 304, configured to determine the operator that the subscriber identity module belongs to according to the identification code of the subscriber identity module; a registering unit 306, configured to lead the subscriber identity module to register in the network of the operator that the subscriber identity module belongs to according to the operator that the subscriber identity module belongs to.

In this technical scheme, the terminal is a terminal that supports network standards of multiple operators, that is, the terminal can support the networks of multiple operators (such as two or all of the first operator, the second operator, or the third operator). By obtaining the identification code (that is, Integrate Circuit Card Identity, ICCID) of the subscriber identity module (that is, the SIM card), it is possible to determine the operator that the subscriber identity module belongs to accurately, that is, it is possible to determine the operator that the SIM card inserted by the user belongs to, and further lead the SIM card to register in the network of a corresponding operator. In this way, the terminal can select the network of the operator to be registered according to the SIM card type, and different demands of users can be satisfied.

Specifically, when the terminal according to the present disclosure is used, the terminal can automatically select and register in the corresponding network, and the user does not need to pay attention to which operator the SIM card belongs to, this will help improve the user experience. For terminal developers, there is no need to develop a variety of projects to satisfy the requirements of different operators, therefore, the product development cycle can be shorten, and the cost of product development can be reduced.

In the above-mentioned technical scheme, as an implementation, the terminal 300 further includes: a judging unit 308, configured to judge whether the user has set an associated operator of the terminal, before the identification code of the subscriber identity module is obtained by the obtaining unit 302; the registering unit 306 is configured to lead the subscriber identity module to register in the network of a designated operator if the judging unit 308 judges that the user has set the designated operator as the associated operator of the terminal; and the obtaining unit 302 is configured to obtain the identification code of the subscriber identity module if the judging unit 308 judges that the user has not set the associated operator of the terminal.

In this technical scheme, before obtaining the identification code of the subscriber identity module so as to automatically select the operator for network registration, it can also be judged that whether the user has set the associated operator, and if yes, the SIM card can be led directly to register in the network of the associated operator. This scheme can have a variety of application scenarios, for example, the user can autonomously set the terminal to be a customized terminal for an operator according to the SIM card type; or, an operator can set a terminal to be a customized terminal of its own. For terminal developers, the same terminal product can be developed for all operators, and corresponding associated operators can be set for different terminals respectively, this can avoid increasing the cost of product development caused by developing a variety of projects to satisfy the requirements of different developers.

In the above-mentioned technical scheme, as an implementation, the judging unit 308 is further configured to: after the judging unit judges that the user has not set the associated operator of the terminal and before the identification code of the subscriber identity module is obtained by the obtaining unit 302, judge whether automatic detection of the operator that the subscriber identity module belongs to is required. The obtaining unit 302 is configured to obtain the identification code of the subscriber identity module when the judging unit 308 judges that the automatic detection of the operator that the subscriber identity module belongs to is required; and the terminal 300 can further includes: a first loading unit 310, configured to load default configuration information and load the system of the terminal according to the default configuration information when the judging unit 308 judges that the automatic detection of the operator that the subscriber identity module belongs to is not required.

In this technical scheme, if the user has not set the associated operator of the terminal and it is not required to obtain the identification code of the subscriber identity module so as to automatically select the operator for network registration, the default configuration information of the terminal can be loaded so as to load the system of the terminal, and after the system of the terminal is loaded, the subscriber identity module can be led to register in the network according to default configuration.

In the above-mentioned technical scheme, as an implementation, the terminal 300 further includes: a second loading unit 312, configured to load the default configuration information and load the system of the terminal according to the default configuration information when the determining unit 304 fails to determine the operator that the subscriber identity module belongs to according to the identification code of the subscriber identity module.

In this technical scheme, if it is required to obtain the identification code of the subscriber identity module so as to automatically select the operator for network registration, and failed to determine the operator that the subscriber identity module belongs to according to the identification code of the subscriber identity module, the system of the terminal can be loaded according to the default configuration information, and after the system of the terminal is loaded, the terminal can be led to register in the network according to default configuration.

In the above-mentioned technical scheme, as an implementation, the terminal 300 further includes: a third loading unit 314, configured to load configuration information corresponding to the operator that the subscriber identity module belongs to according to the information of the operator that the subscriber identity module belongs to and load the system of the terminal according to the configuration information, before the subscriber identity module is led to register in the network of the operator that the subscriber identity module belongs to by the registering unit 306.

In this technical scheme, the configuration information corresponding to the operator that the subscriber identity module belongs to is loaded according to the information of the operator that the subscriber identity module belongs to, and the system of the terminal is loaded according to the configuration information, in this way, the terminal can adjust the configuration of the system of its own with regard to the operator that the subscriber identity module belongs to, and therefore, it is possible to ensure the adaptation to the needs of the operator.

In the above-mentioned technical scheme, as an implementation, the configuration information includes at least one of the following or a combination thereof: personalized resources set for the operator that the subscriber identity module belongs to, the functional framework of the terminal, and hardware configuration parameters of the terminal.

Among which the personalized resources set for the operator that the subscriber identity module belongs to can be boot screen/shutdown screen of the terminal, UI icons and the like; the functional framework of the terminal includes at least one of the following or a combination thereof: Phone type, whether data service serialization is supported, dual-standby single-pass solution or dual-standby dual-pass solution, LTE voice solutions such as SVLTE, SGLTE, SRLETE, VOLTE, CSFB, and the like; the hardware configuration parameters of the terminal include the configuration scheme of a communication module.

In the above-mentioned technical scheme, as an implementation, when it is needed to lead the subscriber identity module to register in the network of the operator that the subscriber identity module belongs to, the registering unit 306 is configured to: according to the priority of a plurality of communication networks of the operator that the subscriber identity module belongs to as well as network standards supported by the subscriber identity module, lead the subscriber identity module to register in a communication network supported by the terminal and having the highest priority among the plurality of communication networks.

In this technical scheme, the subscriber identity module is led to register in the communication network supported by the terminal and having the highest priority among the plurality of communication networks, in this way, after the SIM card is inserted into the terminal, the user does not need to pay attention to which operator the SIM card belongs to or concern the SIM card type; the terminal can automatically select the operator and the network, this greatly facilitates the operation of the user and is conducive to enhance the user experience.

Technical schemes of the present disclosure will now be described in detail with reference to FIG. 4-FIG. 9.

The technical schemes of the present disclosure is based on the following: the hardware radio frequency (RF) of the terminal can support networks of a variety of standards, for example, support TDD-LTE/FDD-LTE/TDSCDMA/WCDMA/GSM/EVDO/1× and all other network standards. According to the present disclosure, by identifying ICCID of a SIM card so as to load the communication module of different operators automatically, or setting operators manually so as to load a designated communication module, Plug-and-Play (PNP) of the terminal can be achieved without subject to operator restrictions. Besides, the terminal can register in the network of the highest standard, or the function of dynamically set the operator customized version can be realized. In this way, it is possible to meet the different demands of the user of the terminal; the user can dynamically register in a network (that is, the network of the highest standard supported by the SIM card) or specify an operator manually and register in the network of the operator according to actual needs.

Figure 4:
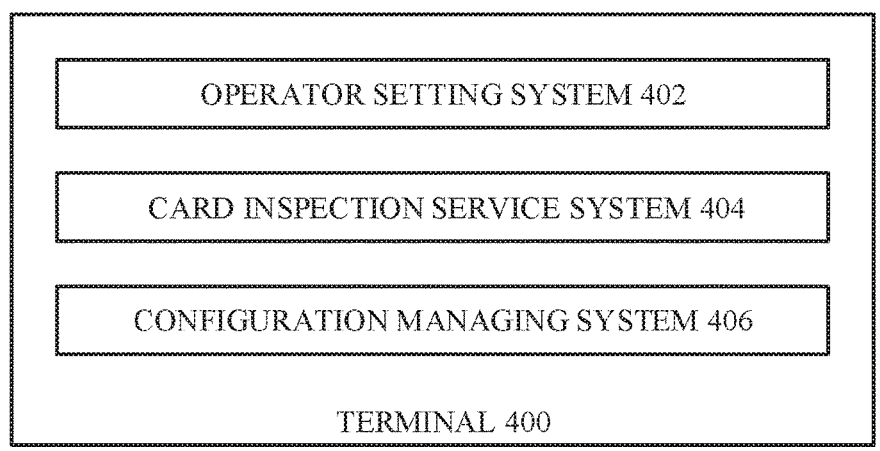
FIG. 4 is a schematic block diagram illustrating a terminal according to an implementation of the present disclosure.

FIG. 4 is a schematic block diagram illustrating a terminal according to another implementation of the present disclosure.

As illustrated in FIG. 4, the terminal according to another implementation of the present disclosure includes: an operator setting system 402, a card inspection service system 404, and a configuration managing system 406.

The operator setting system 402 is a control entry of an entire terminal product, and is configured to achieve the function of automatic match or manual selection of an operator. When set to a full network mode, the terminal can match an operator automatically according to the ICCID information of the SIM card; and when set to some operator, the terminal can customize a corresponding operator product directly.

The card inspection service system 404 can obtain all the information about the card, so as to prepare for the subsequent network registration. In existing terminals, SIM cards that do not meet the requirements of operators are not allowed to register in networks, in contradistinction, in the terminal according to the implementation of the present disclosure, all types of cards are allowed to register in networks in the full network mode without restriction. Besides, an operator(s) can be matched dynamically according to the detected ICCID information of the SIM card, and resources of the matched operator, the system structure of the terminal, as well as a corresponding communication module can be loaded.

The configuration managing system 406 is primarily used as a repository for loading resources. In the configuration managing system 406, operator resources of for at least one of the following are stored: Full Network Mode, the first operator, the second operator, the third operator, Framework structure, and module MBN. For Android system, the Framework structure includes: Phone type loaded, whether data service serialization is supported, dual-standby single-pass solution or dual-standby dual-pass solution, information about communication chip solutions such as SVLTE, SGLTE, SRLTE, CSFB and the like. Among which, Table 1 illustrates a configuration example.

TABLE 1

| Full Network Mode Configuration | The First Operator Configuration | The Second Operator Configuration |
| --- | --- | --- |
| Phone type loaded: null<br>Operator type: null<br>DSDS/DSDA type: null<br>Chip solution: null<br>. . . | Phone type loaded: GSMPhone<br>Operator type: the first operator<br>DSDS/DSDA type: DSDA<br>Chip solution: SGLTE<br>. . . | Phone type loaded: CDMAPhone<br>Operator type: the second operator<br>DSDS/DSDA type: DSDS<br>Chip solution: SRLTE<br>. . . |

Figure 5:
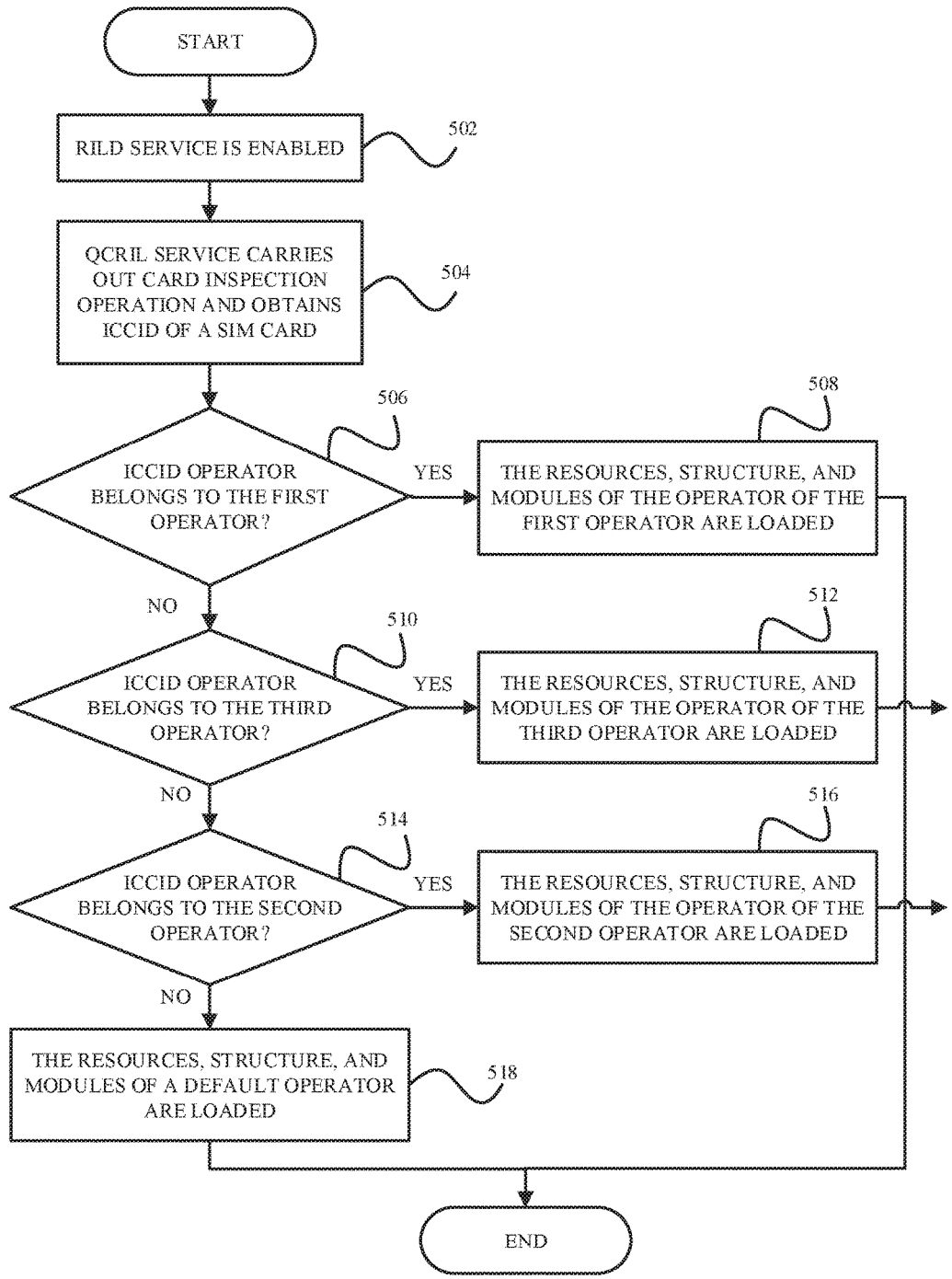
FIG. 5 is a schematic process flow chart of a card inspection service system according to an implementation of the present disclosure.

FIG. 5 is a schematic process flow chart of a card inspection service system according to a first implementation of the present disclosure.

As illustrated in FIG. 5, the process of the card inspection service system according to the first implementation of the present disclosure includes the follows.

In S402, Rild service is enabled, in this implementation, take Android system as an example for explanation.

In S504, Qcril service carries out card inspection operation and obtains ICCID of a SIM card.

In S506, it is judged whether the operator of the ICCID belongs to the first operator, and if yes, proceeds to S508, otherwise, proceed to S510.

In S508, the operator of the ICCID belongs to the first operator, and the resources, structure, and modules of the operator of the first operator are loaded.

In S510, the operator of the ICCID does not belong to the first operator, and it is judged whether the operator of the ICCID belongs to the third operator, and if yes, proceed to S512, otherwise, proceed to S514.

In S512, the operator of the ICCID belongs to the third operator, and the resources, structure, and modules of the operator of the third operator are loaded.

In S514, the operator of the ICCID does not belong to the third operator, and it is judged whether the operator of the ICCID belongs to the second operator, and if yes, proceed to S516, otherwise, proceed to S518.

In S516, the operator of the ICCID belongs to the second operator, and the resources, structure, and modules of the operator of the second operator are loaded.

In S518, the operator of the ICCID does not belong to the second operator, and the resources, structure, and modules of a default operator are loaded.

Figure 6:
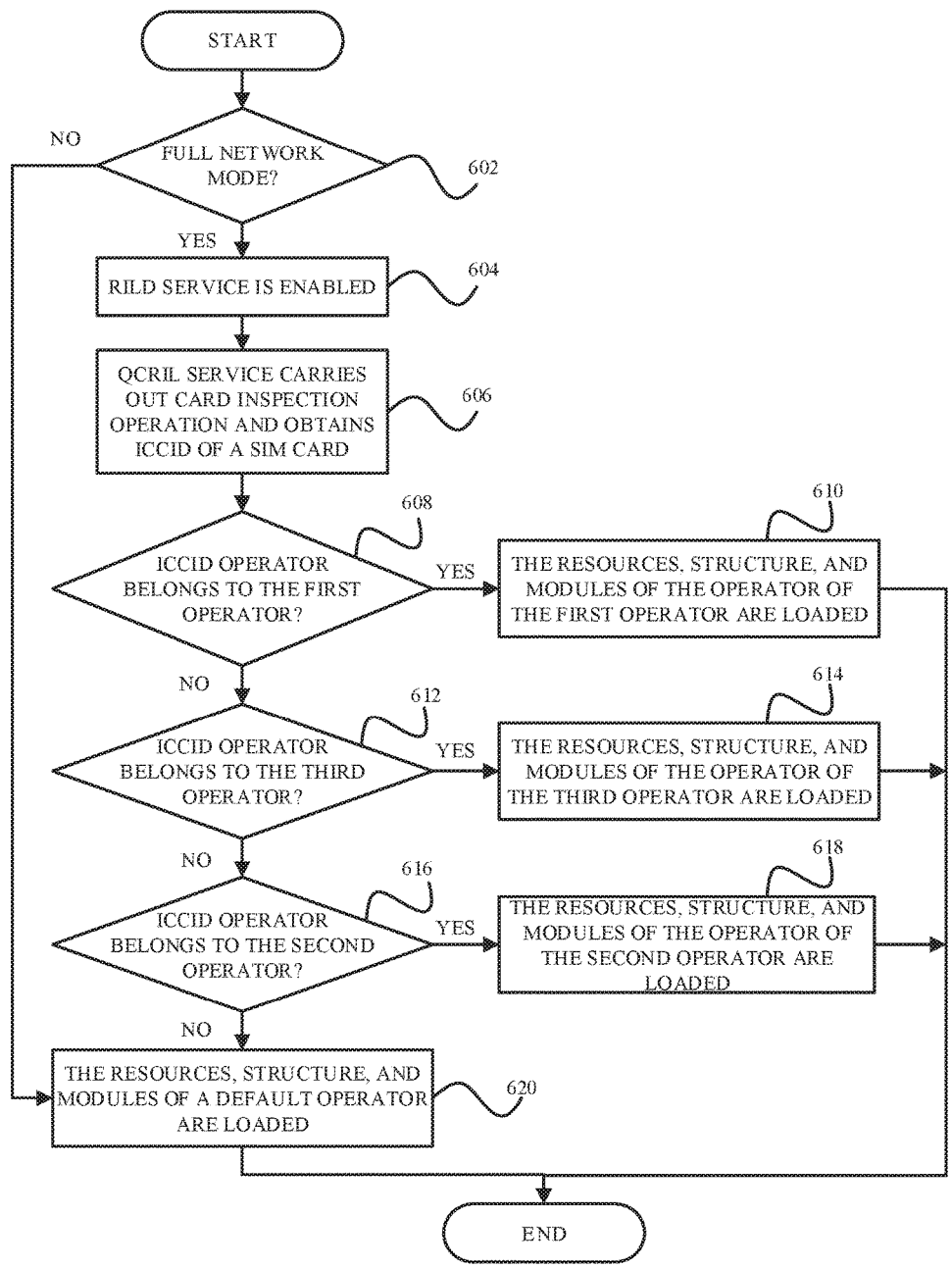
FIG. 6 is a schematic process flow chart of a card inspection service system according to an implementation of the present disclosure.

FIG. 6 is a schematic process flow chart of a card inspection service system according to a second implementation of the present disclosure.

As illustrated in FIG. 6, the process of the card inspection service system according to the second implementation of the present disclosure includes the follows.

In S602, it is judged whether a full network mode (that is, a mode in which operators can be matched automatically) is turned on, and if yes, proceeds to S604, otherwise, proceed to S620.

In S604, if it is judged that the full network mode is turned on, Rild service is enabled; in this implementation, take Android system as an example for explanation.

In S606, Qcril service carries out card inspection operation and obtains ICCID of a SIM card.

In S608, it is judged whether the operator of the ICCID belongs to the first operator, and if yes, proceed to S610; otherwise, proceed to S612.

In S610, the operator of the ICCID belongs to the first operator, and the resources, structure, and modules of the operator of the first operator are loaded.

In S612, the operator of the ICCID does not belong to the first operator, and it is judged whether the operator of the ICCID belongs to the third operator, and if yes, proceed to S614, otherwise, proceed to S616.

In S614, the operator of the ICCID belongs to the third operator, and the resources, structure, and modules of the operator of the third operator are loaded.

In S616, the operator of the ICCID does not belong to the third operator, and it is judged whether the operator of the ICCID belongs to the second operator, and if yes, proceed to S618, otherwise, proceed to S620.

In S618, the operator of the ICCID belongs to the second operator, and the resources, structure, and modules of the operator of the second operator are loaded.

In S620, the full network mode is not turned on, or, the operator of the ICCID does not belong to the second operator, and the resources, structure, and modules of a default operator are loaded.

Figure 7:
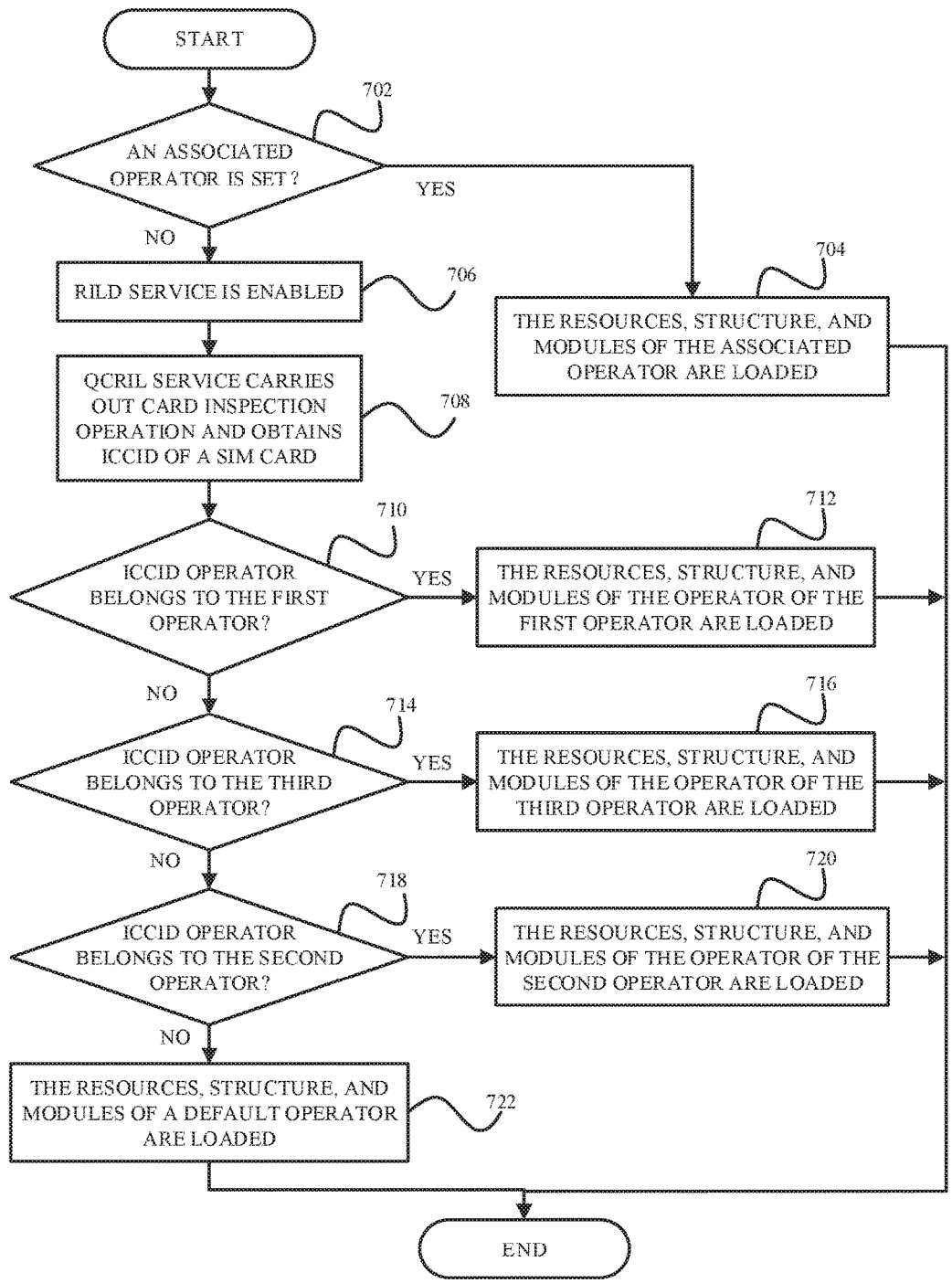
FIG. 7 is a schematic process flow chart of a card inspection service system according to an implementation of the present disclosure.

FIG. 7 is a schematic process flow chart of a card inspection service system according to a third implementation of the present disclosure.

As illustrated in FIG. 7, the process of the card inspection service system according to the third implementation of the present disclosure includes the follows.

In S702, it is judged whether an associated operator is set, and if yes, proceed to S704, otherwise, proceed to S706; among which the associated operator can be set manually by user or set by default when the terminal is shipped from the factory.

In S704, the associated operator has been set, and the resources, structure, and modules of the associated operator are loaded. For example, the first operator has been set to be the associated operator, and the resources, structure, and modules of the operator of the first operator will be loaded; or, the third operator has been set to be the associated operator, and the resources, structure, and modules of the operator of the third operator will be loaded; or, the second operator has been set to be the associated operator, and the resources, structure, and modules of the operator of the second operator will be loaded.

In S706, the associated operator has not been set, Rild service is enabled; and in this implementation, take Android system as an example for explanation.

In S708, Qcril service carries out card inspection operation and obtains ICCID of a SIM card.

In S710, it is judged whether the operator of the ICCID belongs to the first operator, and if yes, proceeds to S712, otherwise, proceed to S714.

In S712, the operator of the ICCID belongs to the first operator, and the resources, structure, and modules of the operator of the first operator are loaded.

In S714, the operator of the ICCID does not belong to the first operator, and it is judged whether the operator of the ICCID belongs to the third operator, and if yes, proceed to S716, otherwise, proceed to S718.

In S716, the operator of the ICCID belongs to the third operator, and the resources, structure, and modules of the operator of the third operator are loaded.

In S718, the operator of the ICCID does not belong to the third operator, and it is judged whether the operator of the ICCID belongs to the second operator, and if yes, proceed to S720, otherwise, proceed to S722.

In S720, the operator of the ICCID belongs to the second operator, and the resources, structure, and modules of the operator of the second operator are loaded.

In S722, it is judged that the full network mode is turned off, or the operator of the ICCID does not belong to the second operator, the resources, structure, and modules of a default operator are loaded.

Figure 8:
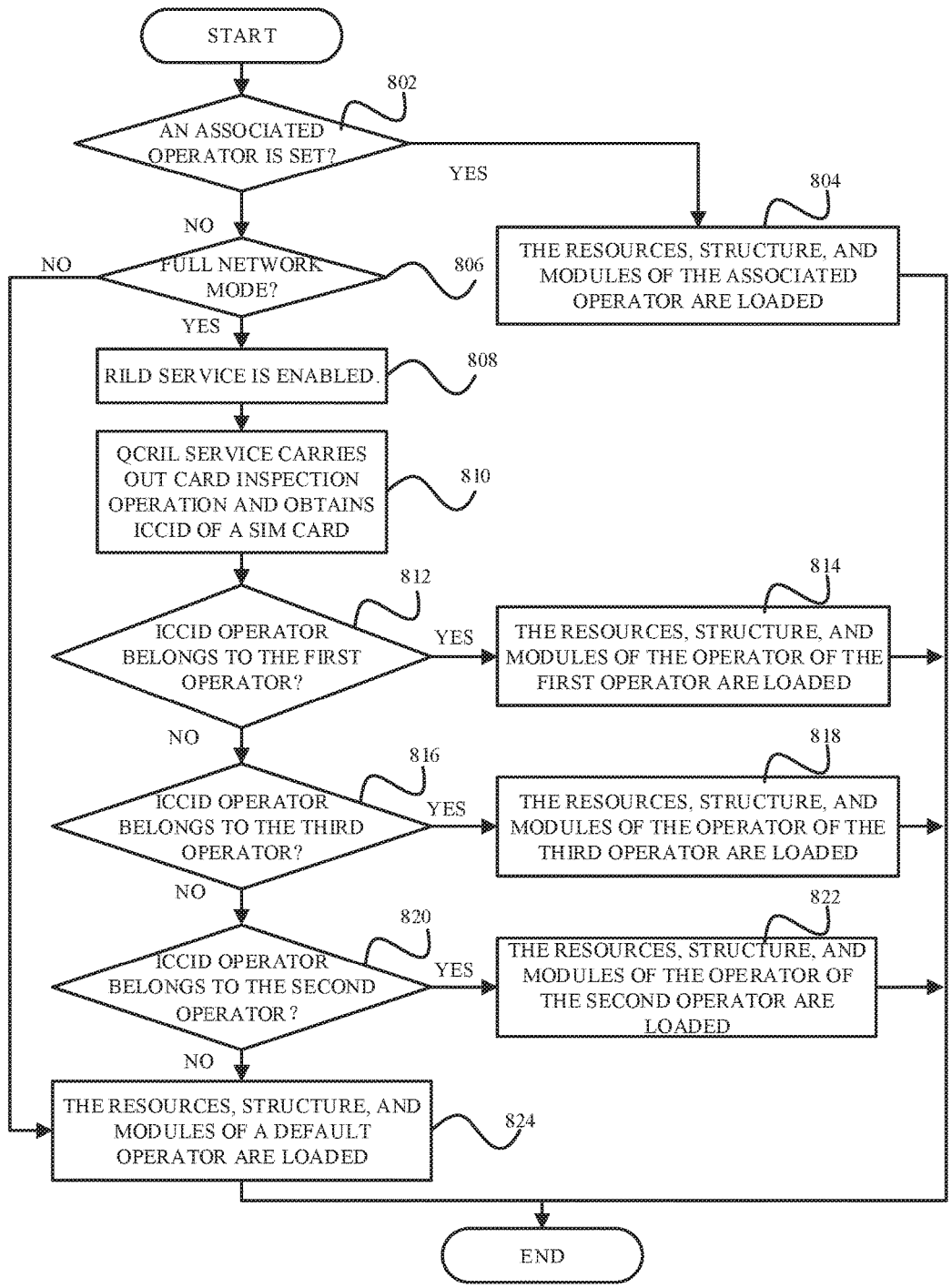
FIG. 8 is a schematic process flow chart of a card inspection service system according to an implementation of the present disclosure.

FIG. 8 is a schematic process flow chart of a card inspection service system according to a fourth implementation of the present disclosure.

As illustrated in FIG. 8, the process of the card inspection service system according to the fourth implementation of the present disclosure includes the follows.

In S802, it is judged whether an associated operator is set, and if yes, proceed to S804, otherwise, proceed to S806; among which the associated operator can be set manually by user or set by default when the terminal is shipped from the factory.

In S804, the associated operator has been set, and the resources, structure, and modules of the associated operator are loaded. For example, the first operator has been set to be the associated operator, and the resources, structure, and modules of the operator of the first operator will be loaded; or, the third operator has been set to be the associated operator, and the resources, structure, and modules of the operator of the third operator will be loaded; or, the second operator has been set to be the associated operator, and the resources, structure, and modules of the operator of the second operator will be loaded.

In S806, the associated operator has not been set, and it is judged whether the full network mode is turned on, and if yes, proceeds to S808, otherwise, proceed to S824.

In S808, the full network mode is turned on, Rild service is enabled; and in this implementation, take Android system as an example for explanation.

In S810, Qcril service carries out card inspection operation and obtains ICCID of a SIM card.

In S812, it is judged whether the operator of the ICCID belongs to the first operator, and if yes, proceeds to S814, otherwise, proceed to S816.

In S814, the operator of the ICCID belongs to the first operator, and the resources, structure, and modules of the operator of the first operator are loaded.

In S816, the operator of the ICCID does not belong to the first operator, and it is judged whether the operator of the ICCID belongs to the third operator, and if yes, proceed to S818, otherwise, proceed to S820.

In S818, the operator of the ICCID belongs to the third operator, and the resources, structure, and modules of the operator of the third operator are loaded.

In S820, the operator of the ICCID does not belong to the third operator, and it is judged whether the operator of the ICCID belongs to the second operator, and if yes, proceed to S822, otherwise, proceed to S824.

In S822, the operator of the ICCID belongs to the second operator, and the resources, structure, and modules of the operator of the second operator are loaded.

In S824, it is judged that the full network mode is turned off, or the operator of the ICCID does not belong to the second operator, the resources, structure, and modules of a default operator are loaded.

Figure 9:
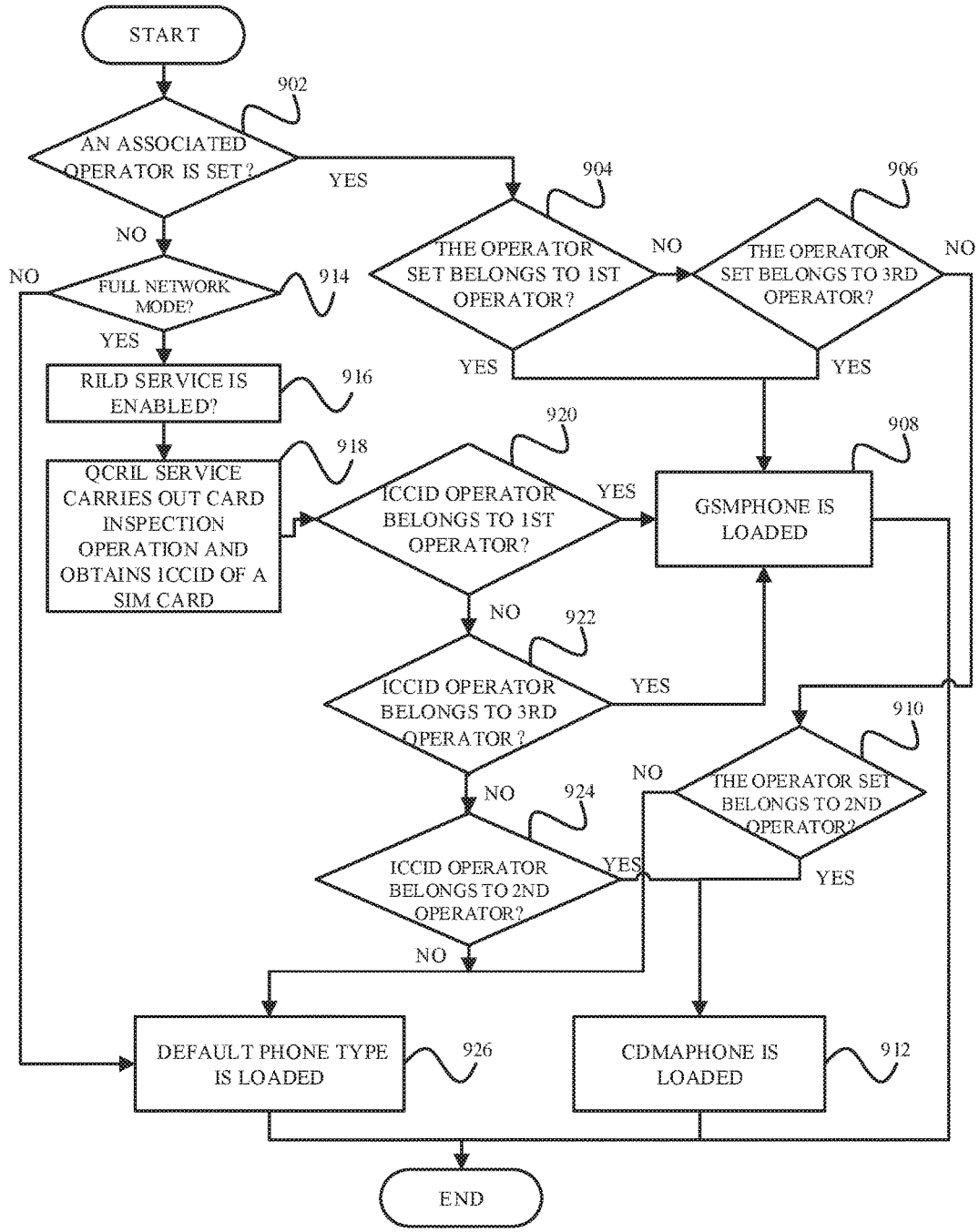
FIG. 9 is a schematic flow chart of loading phone type according to an implementation of the present disclosure.

FIG. 9 is a schematic flow chart of loading Phone type according to an implementation of the present disclosure.

In this implementation, the method for loading Phone type will be described by taking the card inspection process of FIG. 8 as an example, which is similar to the card inspection processes corresponding to the card inspection process of FIG. 5-FIG. 7. As illustrated in FIG. 9, the process of loading Phone type according to the implementation of the present disclosure includes the follows.

In S902, it is judged whether an associated operator is set, and if yes, proceeds to S904, otherwise, proceed to S910.

In S904, the associated operator has been set, and it is judged whether the set associated operator belongs to the first operator, and if yes, proceed to S908, otherwise, proceed to S906.

In S906, the set associated operator does not belong to the first operator, and it is judged whether the set associated operator belongs to the third operator, and if yes, proceed to S908, otherwise, proceed to S910.

In S908, GSMPhone is loaded.

In S910, the set associated operator does not belong to the third operator, and it is judged whether the set associated operator belongs to the second operator, and if yes, proceed to S912, otherwise, proceed to S926.

In S912, CDMAPhone is loaded.

In S914, the associated operator has not been set, and it is judged whether the full network mode is turned on, and if yes, proceeds to S916, otherwise, proceed to S926.

In S916, Rild service is enabled.

In S918, Qcril service carries out card inspection operation and obtains ICCID of a SIM card.

In S920, it is judged whether the operator of the ICCID belongs to the first operator, and if yes, returns to S908, otherwise, proceed to S922.

In S922, the operator of the ICCID does not belong to the first operator, and it is judged whether the operator of the ICCID belongs to the third operator; if yes, return to S908, otherwise, proceed to S924.

In S924, the operator of the ICCID does not belong to the third operator, and it is judged whether the operator of the ICCID belongs to the second operator; if yes, return to S910; otherwise, proceed to S926.

In S926, a default Phone type is loaded.

It will be appreciated by those skilled in the art, the above-mentioned determining and/or judging process is not limited to judge whether the operator of the ICCID belongs to the first operator, then judge whether it belongs to the third operator, and at the end, judge whether it belongs to the second operator; the process can be performed in any other order, for example, whether the operator of the ICCID belongs to the third operator or the second operator can be judged at the first place.

Figure 10:
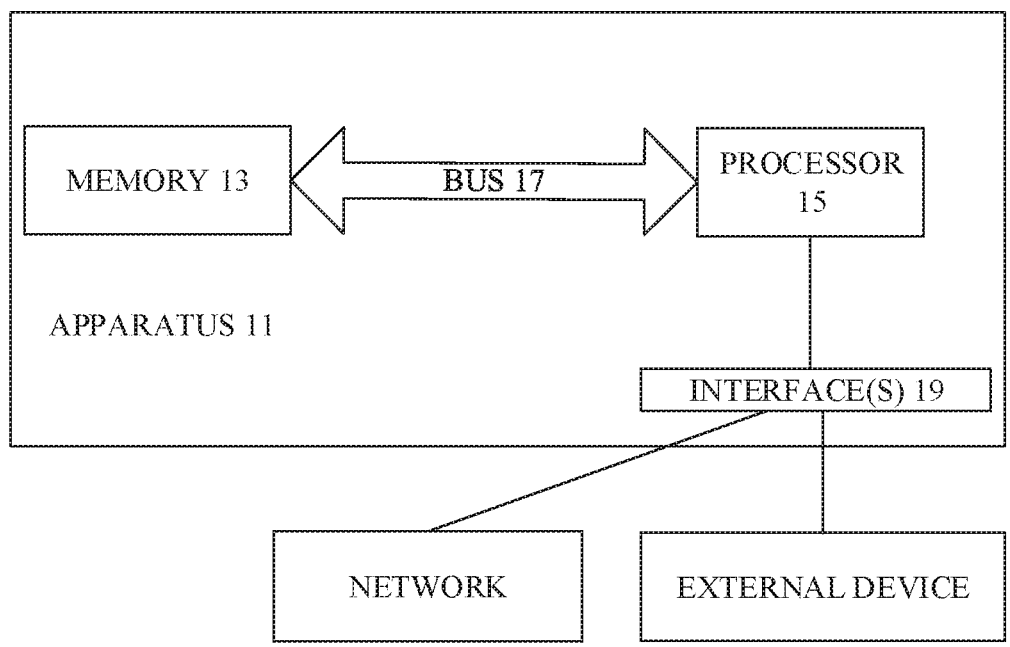
FIG. 10 is a block diagram illustrating an apparatus according to an implementation of the present disclosure.

According to another aspect of the present disclosure, it is provided an apparatus. FIG. 10 is a block diagram illustrating the apparatus. As illustrated in FIG. 10, the apparatus 11 includes a memory 13 and at least one processor 15 (for clarity, only one is illustrated in the figure). The memory 13 and the processor 15 can be connected in a wired or wireless manner, for example, through a bus 17. For example, the apparatus 11 of the implementation can be a server or a terminal, or can be equipment that is able to be arranged in a terminal, a server, or the network registration device described above.

To be specific, the memory 13 is configured to store computer-readable program code, and can be ROM, RAM, CD-RAM, or any other removable storage medium; the processor 15 is configured to invoke the computer-readable program code stored in the memory 13 to execute predetermined process such as the methods according to the implementations of the present disclosure described above, or to run elements, units, or modules included in the network registration device according to the implementations of the present disclosure, to avoid unnecessarily obscuring the present disclosure, details of the network registration method and the network registration device, such as the steps and the structure, are not provided here.

In addition, as shown in FIG. 10, the processor 15 can but not necessarily connect to an external device or network through an interface 19.

According to a further implementation of the disclosure, it is provided a computer-readable storage medium configured to store computer-readable program code, when executed on a data-processing apparatus, the program code is adapted to cause the data-processing apparatus to perform the methods as described in the above-mentioned implementations. In order to avoid unnecessarily obscuring the present disclosure, the details of these implementations will not be repeated here.

The computer-readable storage medium may be referred to as a non-volatile computer-readable storage medium or tangible computer-readable medium. Examples of computer-readable storage medium include but are not limited to: magnetic hard disk drive, solid state hard disk, flash memory, USB thumb drive, RAM, ROM, magneto-optical disk, and the register file of the processor.

The term computer readable-storage medium also refers to various types of recording media capable of being accessed by the computer device via a network or communication link. For example, data may be retrieved over a modem, over the internet, or over a local area network. References to a computer-readable storage medium should be interpreted as possibly being multiple computer-readable storage mediums. For example, the computer-readable storage medium can be multiple computer-readable storage medium within the same computer system, or, can be computer readable storage medium distributed among multiple computer systems or computing devices.

Support for all-standard network is a development trend for terminals, and it is strived to be compatible with requirements of networks of all operators. With aid of the technical scheme of the present disclosure, support for all-standard network of terminals can be achieved, and users can be provided with network maximization service. The user does not need to care about the type of SIM card inserted and the operator that the SIM card belongs to. The user can set a default operator for the terminal manually so as to satisfy the requirements of different operators, that is, one terminal can be used as a customized terminal for different operators. And for the developers, through the technical schemes of the present disclosure, development cost of projects for different operators can be reduced and development circuit of projects can be shorten.

Technical schemes of the present disclosure have been described with reference to the accompanying drawings, in which a new network registration solution for a terminal is proposed. The terminal can automatically select the network to be registered of an operator according to the type of a SIM card, therefore, different demands of users can be satisfied and the user experience can be improved. At the same time, for terminal developers, there is no need to develop multiple projects to meet the requirements of different operators, in this way, the development circle of products can be shorten and the development cost of products can be reduced.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method of network registration for a terminal adapted to support network standards of multiple operators, comprising:
   determining whether an associated operator of the terminal has been set by a user;
   based on a determination that a designated operator has been set as the associated operator of the terminal by the user, leading a subscriber identity module to register in a network of the designated operator;
   based on a determination that the associated operator of the terminal has not been set by the user, obtaining an identification code of the subscriber identity module after the subscriber identity module is installed on the terminal;
   determining an operator that the subscriber identity module belongs to according to the identification code of the subscriber identity module; and
   according to the operator that the subscriber identity module belongs to, leading the subscriber identity module to register in a network of the operator that the subscriber identity module belongs to.

2. The method of claim 1, further comprising:
   based on a determination that the associated operator of the terminal has not been set by the user, prior to obtaining the identification code of the subscriber identity module, determining whether automatic detection of the operator that the subscriber identity module belongs to is required;
   based on a determination that the automatic detection of the operator that the subscriber identity module belongs to is required, obtaining the identification code of the subscriber identity module; and
   based on a determination that the automatic detection of the operator that the subscriber identity module belongs to is not required, loading default configuration information and loading a system of the terminal according to the default configuration information.

3. The method of claim 1, further comprising:
   when the operator that the subscriber identity module belongs to is failed to be determined according to the identification code of the subscriber identity module, loading default configuration information and loading a system of the terminal according to the default configuration information.

4. The method of claim 1, further comprising:
   prior to leading the subscriber identity module to register in the network of the operator that the subscriber identity module belongs to, loading configuration information corresponding to the operator that the subscriber identity module belongs to according to information of the operator that the subscriber identity module belongs to, and loading a system of the terminal according to the configuration information.

5. The method of claim 4, wherein the configuration information comprises at least one of:

personalized resources set for the operator that the subscriber identity module belongs to, a functional framework of the terminal, and hardware configuration parameters of the terminal.

6. The method of claim 5, wherein the functional framework of the terminal comprises at least one of:
a phone type, an indication of whether data service serialization is supported, dual-standby single-pass or dual-pass solution, and LTE voice solutions.

7. The method of claim 1, wherein leading the subscriber identity module to register in the network of the operator that the subscriber identity module belongs to comprises:
according to priorities of communication networks of the operator that the subscriber identity module belongs to and network standards supported by the subscriber identity module, leading the subscriber identity module to register in a communication network supported by the terminal having the highest priority in the communication networks.

8. A device for network registration of a terminal adapted to support network standards of multiple operators, comprising:
at least one processor; and
a memory storing program codes executable by the at least one processor to cause the at least one processor to:
determine whether an associated operator of the terminal has been set by a user;
lead a subscriber identity module to register in a network of a designated operator based on a determination that a designated operator has been set as the associated operator of the terminal by the user;
obtain an identification code of the subscriber identity module after the subscriber identity module is installed on the terminal based on a determination that the associated operator of the terminal has not been set by the user;
determine an operator that the subscriber identity module belongs to according to the identification code of the subscriber identity module; and
according to the operator that the subscriber identity module belongs to, lead the subscriber identity module to register in a network of the operator that the subscriber identity module belongs to.

9. The device of claim 8, wherein the program codes further comprise program codes executable by the at least one processor to cause the at least one processor to:
prior to obtaining the identification code, determine whether automatic detection of the operator that the subscriber identity module belongs to is required, based on a determination that the associated operator of the terminal has not been set by the user;
obtain the identification code of the subscriber identity module based on a determination that the automatic detection of the operator that the subscriber identity module belongs to is required; and
load default configuration information and load a system of the terminal according to the default configuration information based on a determination that the automatic detection of the operator that the subscriber identity module belongs to is not required.

10. The device of claim 8, wherein the program codes further comprise program codes executable by the at least one processor to cause the at least one processor to:
load default configuration information and load a system of the terminal according to the default configuration information when the operator that the subscriber identity module belongs to is failed to be determined according to the identification code of the subscriber identity module.

11. The device of claim 8, wherein the program codes further comprise program codes executable by the at least one processor to cause the at least one processor to:
load configuration information corresponding to the operator that the subscriber identity module belongs to according to the configuration information of the operator that the subscriber identity module belongs to and load a system of the terminal according to the configuration information, prior to leading the subscriber identity module to register in the network of the operator that the subscriber identity module belongs to.

12. The device of claim 11, wherein the configuration information comprises at least one of:
personalized resources set for the operator that the subscriber identity module belongs to, a functional framework of the terminal, and hardware configuration parameters of the terminal.

13. The device of claim 12, wherein the functional framework of the terminal comprises at least one of:
phone type, an indication of whether data service serialization is supported, dual-standby single-pass or dual-pass solution, and LTE voice solutions.

14. The device of claim 8, wherein the program codes to lead the subscriber identity module to register in the network of the operator that the subscriber identity module belongs to further comprise program codes to:
lead the subscriber identity module to register in a communication network supported by the terminal having the highest priority in communication networks when it is required to lead the subscriber identity module to register in the network of the operator that the subscriber identity module belongs to, according to priorities of the communication networks of the operator that the subscriber identity module belongs to and network standards supported by the subscriber identity module.

15. A non-transitory computer readable storage medium comprising program codes, which when executed by a data-processing apparatus, become operational with the data-processing apparatus to:
determine whether an associated operator of the terminal has been set by a user;
based on a determination that a designated operator has been set as the associated operator of the terminal by the user, lead the subscriber identity module to register in a network of the designated operator;
based on a determination that the associated operator of the terminal has not been set by the user, obtain an identification code of the subscriber identity module after the subscriber identity module is installed on the terminal;
determine an operator that the subscriber identity module belongs to according to the identification code of the subscriber identity module; and
according to the operator that the subscriber identity module belongs to, lead the subscriber identity module to register in a network of the operator that the subscriber identity module belongs to.

16. The non-transitory computer readable storage medium of claim 15, further comprising program codes to:
based on a determination that the associated operator of the terminal has not been set by the user and prior to obtaining the identification code of the subscriber identity module, determine whether automatic detection of the operator that the subscriber identity module belongs to is required;

based on a determination that the automatic detection of the operator that the subscriber identity module belongs to is required, obtain the identification code of the subscriber identity module; and based on a determination that the automatic detection of the operator that the subscriber identity module belongs to is not required, load default configuration information and load a system of the terminal according to the default configuration information.

17. The non-transitory computer readable storage medium of claim 15, further comprising program codes to:

when the operator that the subscriber identity module belongs to is failed to be determined according to the identification code of the subscriber identity module, load default configuration information and load a system of the terminal according to the default configuration information.

* * * * *